United States Patent
Mayol Ramis et al.

(10) Patent No.: US 11,275,761 B2
(45) Date of Patent: *Mar. 15, 2022

(54) DISTRIBUTED DATA STORAGE

(71) Applicant: INTERNATIONAL BUSINESS MACHINES CORPORATION, Armonk, NY (US)

(72) Inventors: Guillem C. Mayol Ramis, Islas Baleares (ES); Jose L. Mujeriego Gomez, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 358 days.

This patent is subject to a terminal disclaimer.

(21) Appl. No.: 15/825,136

(22) Filed: Nov. 29, 2017

(65) Prior Publication Data

US 2019/0079988 A1 Mar. 14, 2019

Related U.S. Application Data

(63) Continuation of application No. 15/702,925, filed on Sep. 13, 2017, now Pat. No. 11,194,836.

(51) Int. Cl.
*G06F 16/27* (2019.01)
*G06F 9/50* (2006.01)
*G06F 16/21* (2019.01)
*G06F 16/28* (2019.01)

(52) U.S. Cl.
CPC ............ *G06F 16/27* (2019.01); *G06F 9/5061* (2013.01); *G06F 16/219* (2019.01); *G06F 16/285* (2019.01)

(58) Field of Classification Search
CPC ....... G06F 16/182; G06F 16/27; G06F 9/5061
See application file for complete search history.

(56) References Cited

U.S. PATENT DOCUMENTS

| | | | |
|---|---|---|---|
| 7,890,463 B2* | 2/2011 | Romem | G06F 16/24539 707/636 |
| 7,941,401 B2 | 5/2011 | Okamoto | |
| 8,577,892 B2 | 11/2013 | Pairault et al. | |
| 9,219,788 B1* | 12/2015 | Buron | H04L 67/18 |
| 9,607,071 B2 | 3/2017 | Stringham | |
| 9,623,336 B2 | 4/2017 | Simon et al. | |
| 9,838,843 B1* | 12/2017 | Bajaj | H04L 67/18 |
| 2004/0148361 A1* | 7/2004 | Ridgley | H04L 29/06 709/212 |

(Continued)

OTHER PUBLICATIONS

Appendix P, List of IBM Patents or Patent Applications Treated as Related dated Nov. 29, 2017.

(Continued)

*Primary Examiner* — Marc S Somers
(74) *Attorney, Agent, or Firm* — Cantor Colburn LLP; Steven Bouknight (57) ABSTRACT

Proposed are concepts for managing the distribution of data elements in a distributed data storage system comprising: a plurality of distributed assets; and a mobile asset associated with a home location. A proposed method comprises: allocating a data element based on a current location of the mobile asset. If the current location of the mobile asset differs from the home location associated with the mobile asset, a replica of the data element is allocated to another asset.

4 Claims, 8 Drawing Sheets

(56) References Cited

U.S. PATENT DOCUMENTS

| | | | | |
|---|---|---|---|---|
| 2010/0312809 A1* | 12/2010 | Calder | ............... | G06F 16/27 |
| | | | | 713/179 |
| 2012/0102169 A1* | 4/2012 | Yu | ..................... | H04L 67/18 |
| | | | | 709/223 |
| 2012/0233117 A1* | 9/2012 | Holt | ............... | G06F 16/1748 |
| | | | | 707/620 |
| 2015/0261786 A1* | 9/2015 | Xu | ..................... | G06F 16/29 |
| | | | | 707/747 |
| 2018/0102985 A1* | 4/2018 | Byers | ............... | H04L 47/823 |

OTHER PUBLICATIONS

Ramis et al., "Distributed Data Storage"; U.S. Appl. No. 15/702,925; filed Sep. 13, 2017.
Cattell, Rick "Scalable SQL and NoSQL data stores" Abstract Only—ACM Digital Library, vol. 39, Issue 4, Dec. 2010; 2 pgs.; http://dl.acm.org/citation.cfm?id=1978919.

* cited by examiner

FIG. 8

DISTRIBUTED DATA STORAGE

DOMESTIC PRIORITY

This application is a continuation of U.S. patent application Ser. No. 15/702,925, filed Sep. 13, 2017, the disclosure of which is incorporated by reference herein in its entirety.

BACKGROUND

The present invention relates to the field of distributed data storage and in particular to managing the distribution of data elements in a distributed data storage system.

Distribution of data across a distributed data storage system (such as a distributed database for example) is typically implemented based on a distribution key. The distribution key is typically hashed (e.g. processed with a hashing algorithm) to obtain a uniform distribution of data across the nodes/members of the distributed data storage system. When appropriately chosen, a distribution key has the effect of creating an affinity (or relationship) between data elements and unique values of the distribution key. However, once the distribution key is defined, there is normally no further way to enhance the affinity (e.g. in an attempt to improve resiliency and/or reduce data duplication in data distribution).

Accordingly, there is a significant need for a system and method that enables the enhancement of an affinity between the distribution concept and data elements of a distributed data storage system.

SUMMARY

According to an embodiment of the present invention there is provided a computer-implemented method for managing the distribution of data elements in a distributed data storage system, the system comprising: a plurality of distributed assets each having a data storage unit for locally storing one or more data elements of the distributed database, each distributed asset being associated with one of a plurality of affinity groups based on its location; and a mobile asset associated with a home location and associated with a first affinity group of the plurality of affinity groups based on the home location. The method comprises associating a data element provided by the mobile asset with a second affinity group of the plurality of affinity groups based on a current location of the mobile asset. The method also comprises allocating the data element to an asset associated with the second affinity group. Also, if the current location of the mobile asset differs from the home location associated with the mobile asset, the method allocates a replica of the data element to an asset associated with the first affinity group.

According to another embodiment of the present invention, there is provided a computer program product for managing the distribution of data elements in a distributed data storage system, the system comprising a plurality of distributed assets each having a data storage unit for locally storing one or more data elements of the distributed database, each distributed asset being associated with one of a plurality of affinity groups based on its location; and a mobile asset associated with a home location and associated with a first affinity group of the plurality of affinity groups based on the home location. The computer program product comprises a computer readable storage medium having program instructions embodied therewith, the program instructions executable by a processing unit to cause the processing unit to perform a method according to an embodiment of the invention.

According to another aspect of the invention, there is provided a system comprising at least one processor and the computer program product according to an embodiment. The at least one processor is adapted to execute the computer program code of said computer program product.

According to yet another aspect of the invention, there is provided a system for managing the distribution of data elements in a distributed database. The system comprises: a plurality of distributed assets each comprising a data storage unit for locally storing one or more data elements of the distributed database, each distributed asset being associated with one of a plurality of affinity groups based on its location. The system also comprises a mobile asset associated with a home location and associated with a first affinity group of the plurality of affinity groups based on the home location. The system further comprises a data management module for managing a distribution of data elements of the distributed database. The data management module is adapted to: associate a data element provided by the mobile asset with a second affinity group of the plurality of affinity groups based on a current location of the mobile asset; and to allocate the data element to an asset associated with the second affinity group. Also, if the current location of the mobile asset differs from the home location associated with the mobile asset, the data management module is adapted to allocate a replica of the data element to an asset associated with the first affinity group.

BRIEF DESCRIPTION OF THE DRAWINGS

Embodiments of the present invention will now be described, by way of example only, with reference to the following drawings, in which.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed is a concept for increasing performance, reducing data duplication and improving resiliency of data in a distributed data storage system. In a proposed embodiment, a data element provided by a mobile asset may be allocated to an affinity group based on a current location of the mobile asset. Also, if the current location of the mobile asset differs from a home location associated with the mobile asset, a replica of the data element may be allocated to an asset associated with another affinity group. In this way, a bi-dimensional affinity may be created based on a location of a mobile asset.

By limiting replication of data elements to those marked as foreign to user's assigned home server (e.g. originating from a location outside of a home location), as opposed to replicating all data elements across all nodes of a distributed data storage system, a data storage requirement may be reduced. Data retrieval performance and efficiency may also be improved, and users need not depend on all nodes of the distributed system being available when making a query or request relating to stored data.

Examples may be applied to mobile networks and the users that connect to those networks. However, the proposed concept(s) may be used in any case where there are static and moving contributors to data of a distributed data storage system. Thus, although in some examples a mobile asset may be mobile computing device, a mobile asset may be any mobile entity that can be assigned a home location. For instance, a mobile asset may be a supermarket client, because such clients typically go shopping in the closest or most convenient stores to home or work for example.

In a system comprising two groups of elements that may be categorized as 'fixed assets' and 'mobile assets' (of which a mobile phone telecommunications network may be well-known example), data may be distributed by these two groups simultaneously and independently across a number of nodes, thus creating a simultaneous bi-dimensional affinity on both independent distribution keys. For this, the distribution of data may be firstly done based on the fixed assets (e.g. sites, masts, cells, or antennas).

Some embodiments may comprise associating each of the plurality of distributed (i.e. fixed) assets with one of the plurality of affinity groups based on its geographic location. For example, each of the plurality of assets may be categorized according to a clustering algorithm, wherein a parameter of the clustering algorithm is based on the location of an asset. Thus, according to the location of the distributed, fixed assets and based on the proximity of each one to the rest (and assuming a reasonable travel distance between fixed asset locations for a mobile asset), a number of clusters of assets may be created in such a way that it allows for the affinity of the data belonging to a single asset and single mobile element within a single node. By clustering fixed (e.g. geographically-static) assets into groups and, furthermore, users into groups based on their normal locality to the fixed assets, data may be keyed in such a way as it is affined to a specific home server when the user is in the locality of an assigned static cluster (e.g. at a home location), and the data marked as foreign if the user produces the data while away from the locality of the assigned static cluster (e.g. away from the home location).

In a proposed embodiment, associating each of the plurality of distributed assets with one of a plurality of affinity groups based on its geographic location may comprise determining a measure of cluster variability and comparing the determined measure of cluster variability against a target variability value. Based on the comparison result, the step of categorizing each of the plurality of distributed assets according to a clustering algorithm may be repeated. Taking such an approach may cater for the dimensional affinity changing over the time. By way of further example, the clustering process may be re-calculated periodically using recent or updated datasets to ensure that the cluster variability is still below/under a target cluster variability.

The mobile asset may be associated with a home location based on historical data relating to previous usage or locations of the mobile asset. In this way, an appropriate home location may be chosen which takes account of previous usage and/or movements of the mobile asset, thus ensuring that data duplication/replication is minimized for example.

In some embodiments, a request to retrieve a data element from the distributed database may be received. The received request may be converted to a transformed request comprising an indicator adapted to indicate whether or not a replica of the data element was allocated to an asset. By way of example, such transformation of a received request may simply employ adding a 'switch' or 'binary indicator' which may be used to determine if copied data needs to be included or not within a retrieved result set. Such a 'two-valued' (or binary) indicator may operate at the two dimensions: mobile asset; and fixed assets. Retrieval of a replica of the data element may then be based on a value of the indicator of the transformed request. In this way, unnecessary duplication of data may be avoided.

Embodiments may periodically repeat the process of associating each of the plurality of distributed assets with one of a plurality of affinity groups based on its geographic location. This may cater for the system changing over the time and thus help to ensure that the distributed assets are appropriately allocated within the system.

Accordingly, there may be provided an approach to generating or defining bi-dimensional affinity in a distributed data storage environment. One dimension may be based on a distribution key with hashing function. A second dimension may be based on location, thus creating an affinity between a location at which a data element was provisioned or created and where it is stored in the distributed data storage system. Embodiments may also provide concepts for the storage of data elements that facilitate the efficient storage and retrieval of data in a distributed environment.

Also, it is noted that, although embodiments are presented in the context of being applicable in the relation to mobile networks, applicability of the proposed concepts may extend to other fields where distributed data storage concepts are employed. For example, embodiments may be implemented in relation to a shared database for a multi-tenanted application where users from one tenant may need to access data belonging to another tenant.

Illustrative embodiments may therefore provide concepts for controlling storage and access of data in a distributed data storage environment. Dynamic data storage and data retrieval concepts may therefore be provided by proposed embodiments.

Modifications and additional steps to a traditional data storage and retrieval systems may also be proposed which may enhance the value and utility of the proposed concepts.

Figure 1:
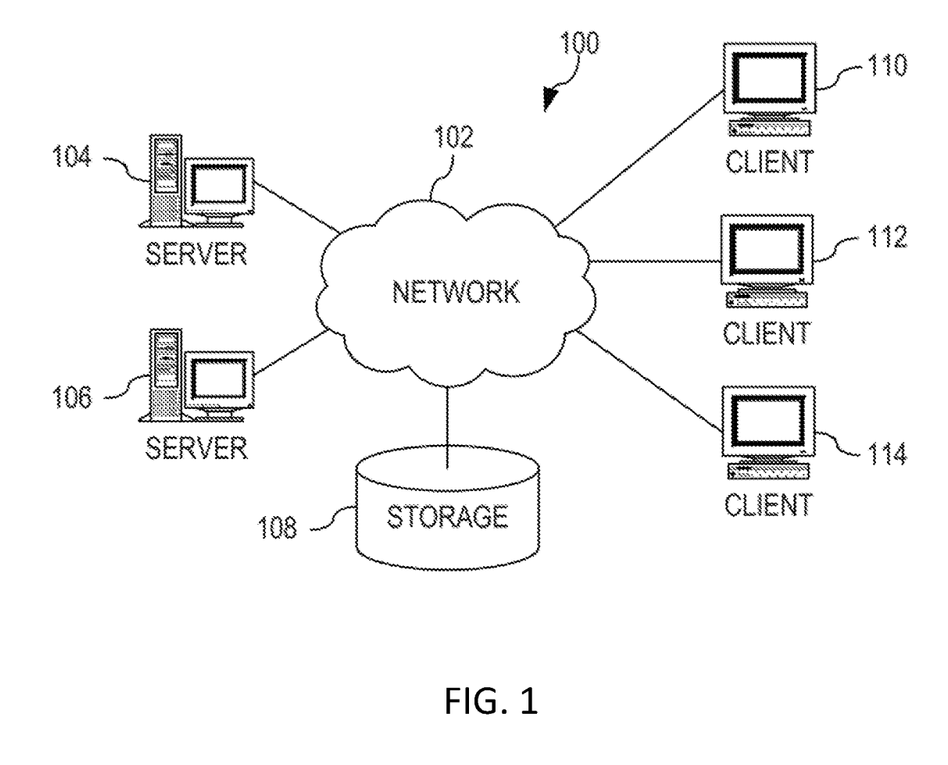
FIG. 1 depicts a pictorial representation of an example distributed system in which aspects of the illustrative embodiments may be implemented.
Figure 2:
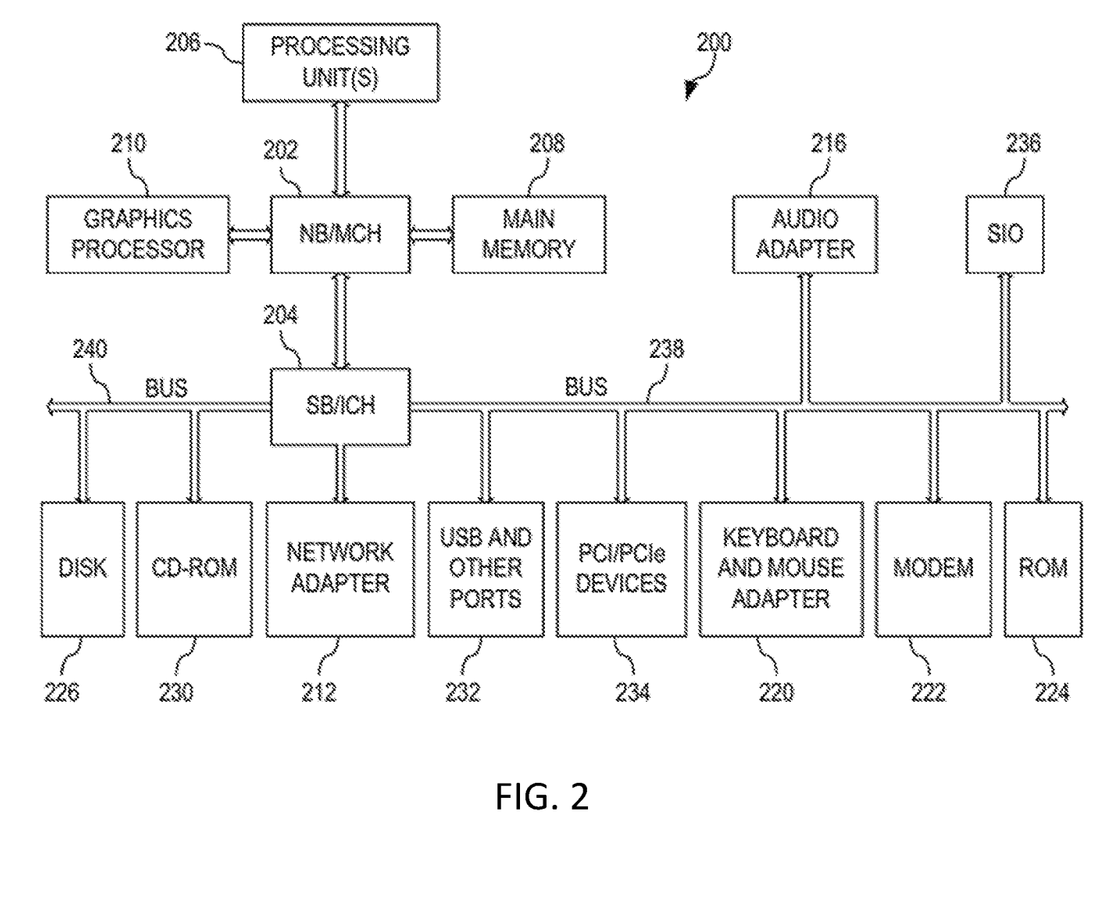
FIG. 2 is a block diagram of an example system in which aspects of the illustrative embodiments may be implemented.

Illustrative embodiments may be utilized in many different types of messaging processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data storage system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed embodiment may enhance distribution of data in a data storage system by allocating data based on a current location of an asset. For instance, if the current location of the mobile asset differs from a home location associated with the mobile asset, a replica of the data element may be allocated to an asset associated with an affinity group for that (non-home) location. In this way, a bi-dimensional affinity may be created based on a location of a mobile asset.

Proposals may work with data inherent to the activity of a user, and need not rely on user preference(s). In particular, distribution of data generated in different geographical locations (which is not a user preference but may instead be an inherent attribute of user activity) may be based on the geographical locations. Information regarding geographic location may be simple to determine and obtain, especially since the applicability of proposed embodiments may be to geographically-distributed networks. Embodiments therefore avoid a need to rely on user preference(s) (which may be difficult to create and collect for example).

A clustering algorithm may be employed to create a clustered user-activity model based on the geographical location(s) of an asset when that activity happened. By using clustering techniques to create the cluster distribution, embodiments may avoid a need to rely on weak relations between preferences that may change over time. Embodiments may instead rely on strong and well-defined affinity relationships based on location information.

By proposing a concept for bi-dimensional affinity, embodiments may help to ensure that data queries using any (or both) of the affinity keys will be confined to a single node. Furthermore, embodiments may provide improved scalability while keeping data duplication to a minimum.

Figure 3:
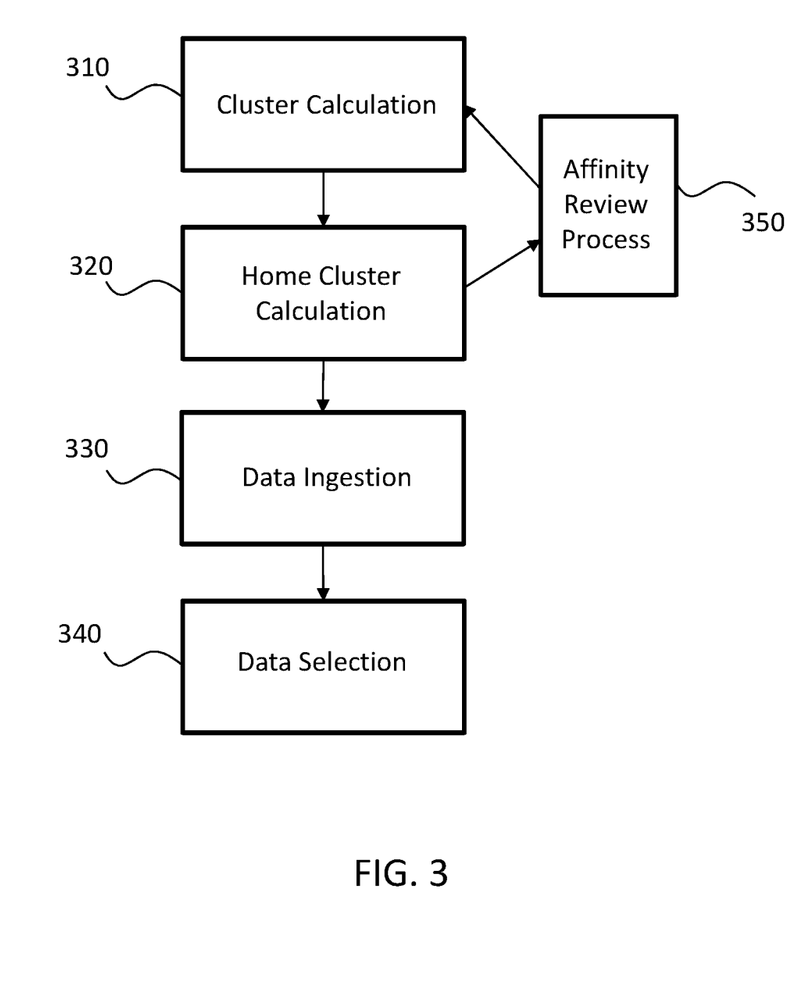
FIG. 3 is a simplified flow diagram of a method according to a proposed embodiment.

Referring now FIG. 3, there is depicted a flow diagram of a method according to a proposed embodiment. The method may be employed for managing the distribution of data elements in a distributed data storage system comprising: (i) a plurality of distributed assets each having a data storage unit for locally storing one or more data elements of the distributed database; and (ii) a mobile asset associated with a home location. A first example may be a cellular network comprising cell towers (that distributed across a geographical area) and mobile users (that may be constantly moving by which may primarily be within a certain (e.g. home) area). Another example may be a retailer network comprising retail stores distributed across various locations and which are usually visited by the same regular visitors (mobile) that happen to live or work close by. Petrol stations, bank branches, and in general any premise/location where physical presence is required may therefore benefit from proposed embodiments.

Each distributed asset may be associated with one of a plurality of affinity groups based on its location. Also, the mobile asset may be associated with a first affinity group of the plurality of affinity groups based on its home location.

Purely by way of example, the distributed assets may be geographically distributed. However, this not need be the case and, in other embodiments, the distributed assets may be locally distributed nodes of a database. In such a database system, distribution may be based on a predefined key wherein the distribution method may be based on hash partitioning for the values of the determined key. The selection of the key may, for example be based on the most advantage key distribution.

The method may begin with step 310 of calculating clusters (c) (or affinity groups) and then, in step 320, assignment of a home cluster (or 'home affinity group') to a mobile key (lmhc) may be undertaken.

In step 330, data ingestion is undertaken so that data elements are allocated so as to be distributed based on location information.

Given data loaded into the database (as undertaken in step 300 for example), the data selection and retrieval can be undertaken in step 340.

Because the dimensional affinity may change over the time, the clustering process of steps 310 and 320 may be repeated periodically using recent datasets. This may be undertaken via an affinity review process 350 in an attempt to ensure that the cluster variability (cv) value remains below a target cluster variability (tcv) value for example. For example, in the review process of step 350 determines that cluster variability exceeds a target value, highest mobile key contributors to the cluster variability may be identified and assigned to new home cluster if required. An example of this situation may be in a mobile communications network where subscribers have permanently re-located to another location (e.g. country or state).

Figure 4:
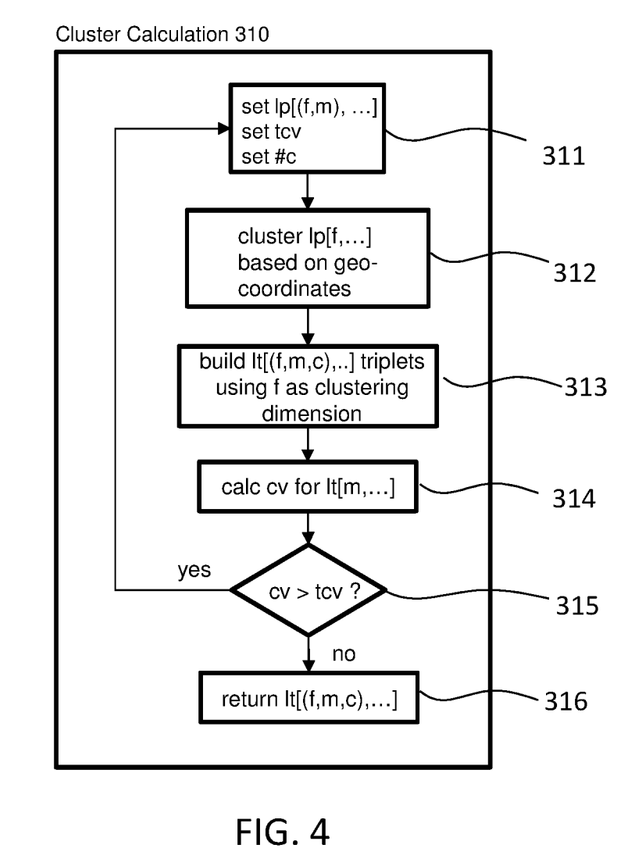
FIG. 4 is an exemplary flow diagram for the step of calculating clusters of the embodiment of FIG. 3.

Referring now to FIG. 4, an exemplary flow diagram for the step 310 of calculating clusters is depicted. This process employs a dataset with a desired list of pairs $lp[(f,m)] = lp[(fixed, mobile), \ldots]$ for an observed/desired period (n to n relationship, extracted from previous data). The dataset may comprise data for a significant amount of time, thus ensuring that all mobile asset (e.g. subscriber) keys and fixed asset (e.g. cell) keys are detected. This process may involve a trade-off between the percentage of cluster variability (cv) and number of clusters (#c), since both values may impact an amount of data duplicated across all clusters.

The process 310 of cluster calculation may begin with the step 311 of defining list of pairs $lp[(f,m)] = lp[(fixed, mobile), \ldots]$, a target cluster variability (tcv) value, and a number of clusters (#c). Next, in step 312, the list of pairs is categorized using a clustering algorithm (e.g. using K-means, or others) with the number of clusters #c parameter and using geographical coordinates. A list of triplets, $lt[(fixed, mobile, cluster), \ldots]$, is then built in step 313 using f (i.e. fixed) as the clustering dimension. In step 314, a cluster variability (cv) value is calculated for the list $lt([m])$.

The calculated cluster variability (cv) value is compared against the target cluster variability (tcv) value in step 315. If it is determined that the calculated cluster variability (cv) value exceeds the target cluster variability (tcv) value (i.e. if cv>tcv) the method returns to step 311 to set a new value for the number of clusters (#c) and then repeats. Conversely, if it is determined that the calculated cluster variability (cv) value does not exceed the target cluster variability (tcv)

value (i.e. if cv<=tcv), the method proceeds to step 316 wherein the list of triplets lt[(fixed, mobile, cluster), . . . ] is returned.

Figure 5:
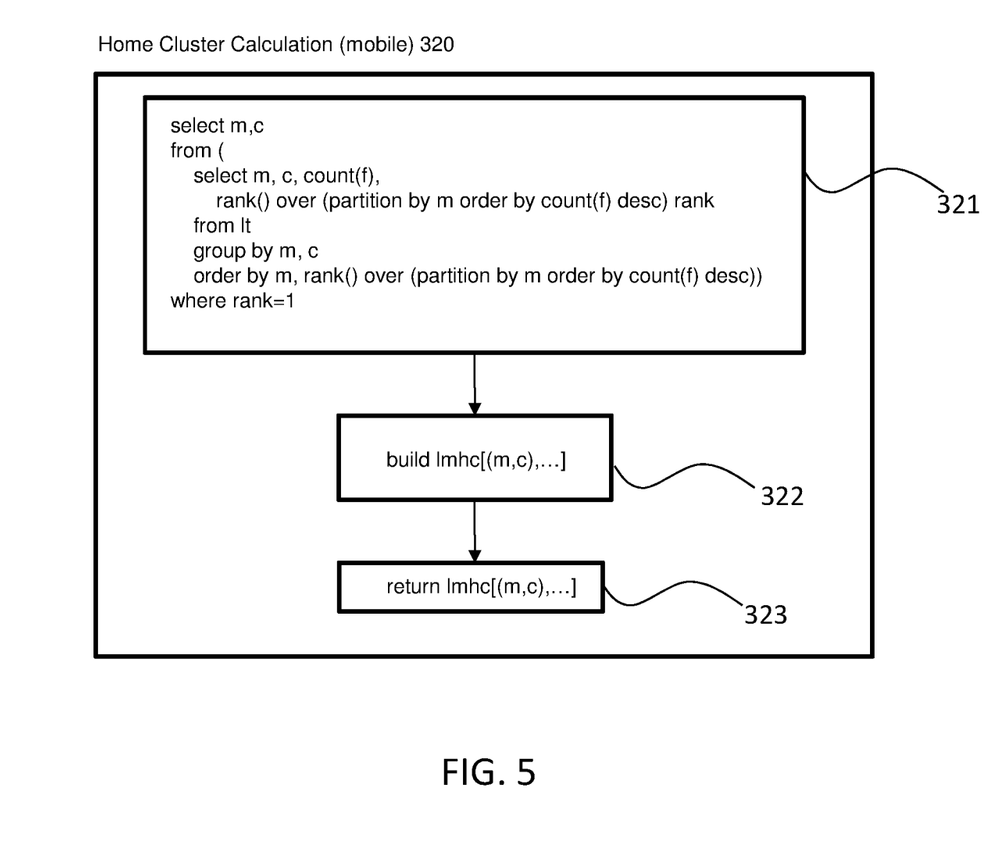
FIG. 5 is an exemplary flow diagram for the step of home cluster calculation of the embodiment of FIG. 3.

Referring now to FIG. 5, an exemplary flow diagram for the step 320 of home cluster calculation is depicted. This process assigns a "Home cluster" to the mobile key (lmhc) (i.e. defines an affinity group associated with a home location of the mobile asset). Here, the list of triplets lt[(f,m,c), . . . ] is used to determine which cluster is more affine to each mobile key.

The steps of this process 320 may be as follows:

(321) Undertake a group count in the list lt by f, m and c. For this, there is selected m, c, count(f), and then they are ranked (using a function rank( )) over a partition by m order by count(f) desc) rank. Then from the list lt, they are grouped by m, c and then ordered by m, rank( ) over a partition by m order by count(f) desc);

(322) For each distinct m keep the one with the highest count and build list of mobile home clusters lmhc [(m,c), . . . ]. For this, one selects m, c, i.e. employs a function (select m, c, count(f), rank( ) over (partition by m order by count(f) desc) rank from lt group by m, c order by m, rank( ) over (partition by m order by count(f) desc)) where rank=1; and (323) the built list is then returned (i.e. return lmhc [(m,c), . . . ]).

Figure 6:
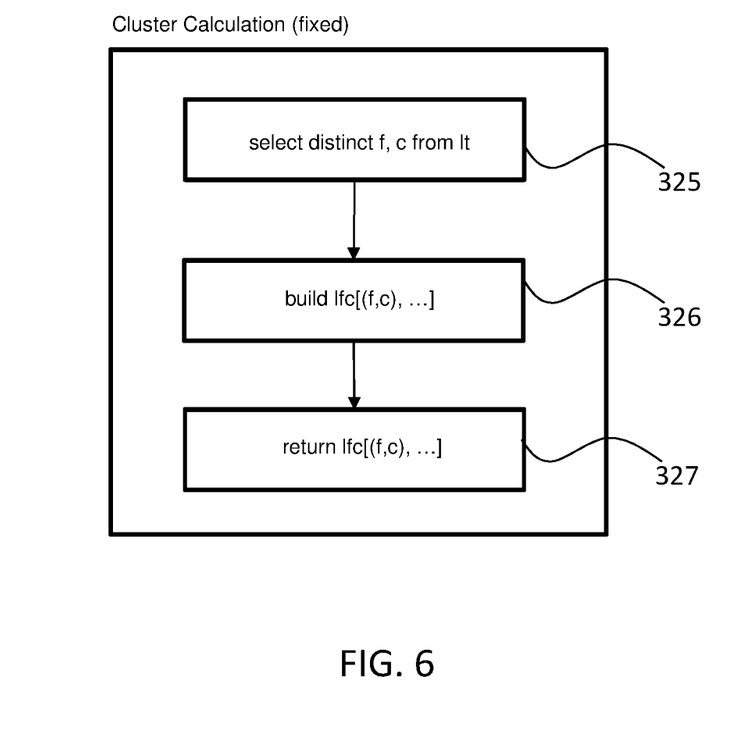
FIG. 6 is an exemplary flow diagram for the process of (fixed) cluster calculation according to an embodiment.

Referring now to FIG. 6, an exemplary flow diagram for the process of (fixed) cluster calculation. This may involve is the assignment of the cluster for each fixed key. Here, the list of triplets lt[(f,m,c), . . . ] may be used to determine which fixed keys belong to each cluster=>lfc[(f,c), . . . ]

The steps of this process may be as follows:

(325) Distinct values for f and c are obtained by selecting distinct f, c from the list of triplets lt;

(326) Build a list of fixed clusters lfc[(f,c), . . . ]; and (327) Return the built list of fixed clusters (i.e. return lfc[(f,c), . . . ])

Figure 7:
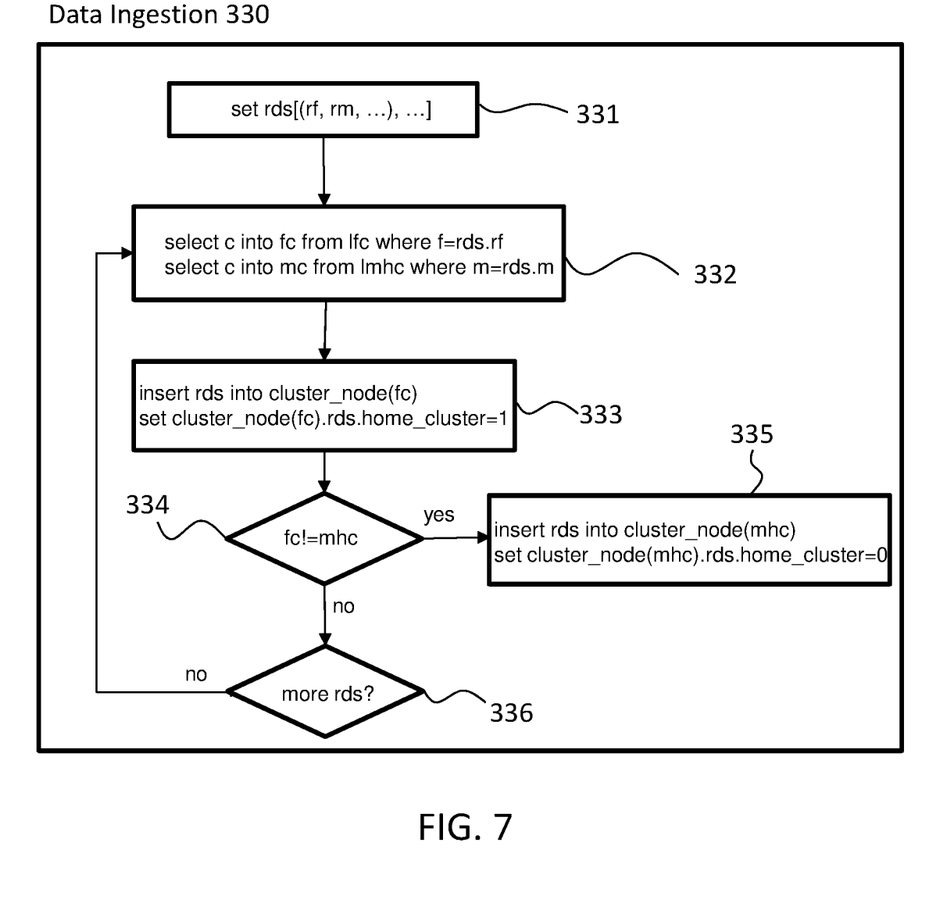
FIG. 7 depicts an exemplary flow diagram for the step of data ingestion for the embodiment of FIG. 3.

Referring now to FIG. 7, an exemplary flow diagram for the step 330 of data ingestion is depicted. This data ingestion process may comprise the usage of the two lists obtained from the cluster calculation processes (i.e. the list of distinct pairs: mobile, home-cluster lmhc[(m,c), . . . ] obtained from the (mobile) cluster calculation process 320 depicted in FIG. 5, and the list of distinct pairs: fixed, home-cluster obtained from the (fixed) cluster calculation process depicted in FIG. 6) to ingest a set of records (rds) with n number of fields. Among the two lists, the fixed key (rf) and mobile key (rm) ids may be mandatory and may require population.

The steps of this data ingestion process 330 may be as follows:

(331) Obtained/ingest the set of records (rds)

(332) Start iteration over each record in rds, namely (i) look-up the cluster for rf in lfc[(f,c), . . . ]→fc; and(ii) look-up the home cluster for rm in lmhc[(m,c), . . . ]→mh (333) Insert record in fc cluster_node and setup home_cluster flag (hcf) to 1 for this record in fc cluster_node (334) Determine if fc!=mhc. If yes, then goto (335). If no, goto (336)

(335) Insert record in mhc cluster_node setting up home_cluster flag (hcf) to 0 for this record in mhc cluster_node (336) Check if more records. If so, return to (332) and continue iteration until last record has been processed.

Accordingly, given a dataset (irds) loaded into a system using the processes mentioned above, the following adaptation(s) to data queries/request may be applied to take advantage of proposed concepts.

(I) Query type 1—Query ONLY fixed by the 'fix key' field (rf) and not the mobile field (rm) to perform any query in the system.

Example issued query: "select * from irds where rf=<fixed_id>" Example of transformed query: "select * from irds where rf=<fixed_id> and hcf=1".

Example of selecting cluster for the query using SQL: "select c from lfc where f=<fixed_id>". Example of transformed query in relevant cluster_node "select * from irds where rf=<fixed_id> and hcf=1 and cluster_node=c".

(II) Query type 2—Query ONLY fixed by the 'mobile key' field (rm) and not the fixed field (rf) to perform any query in the system.

Example issued query: "select * from irds where rm=<mobile_id>". Example of transformed query: "select * from irds where rm=<mobile_id> and (hcf=1 or hcf=0)".

Example of selecting cluster for the query using SQL: "select c from lmhc where m=<mobile_id>". Example of transformed query in relevant cluster_node" "select * from irds where rm=<mobile_id> and (hcf=1 or hcf=0) and cluster_node=c".

(III) Query type 3—Query fixed by 'fix key' field (rf) and 'mobile key' field (rm) to perform any query in the system.

Example issued query: "select * from irds where rm=<mobile_id> and rf=<fixed_id>". Example of transformed query: "select * from irds where rm=<mobile_id> and rf=<fixed_id> and hcf=1".

Example of selecting cluster for the query using SQL: "select c from lmhc where m=<mobile_id>". Example of transformed query in relevant cluster_node" "select * from irds where rm=<mobile_id> and rf=<fixed_id> and hcf=1 and cluster_node=c".

(IV) Query type 4—Query NOT fixed by 'fix key' field (rf) or 'mobile key' field (rm) to perform any query in the system.

Example issued query: "select * from irds where <other_>=<other_id>". Example of transformed query: "select * from irds where <other_>=<other_id> and hcf=1". Execute transformed query in all clusters "select * from irds where <other_>=<other_id> and hcf=1". In this type, the query must run on all clusters.

From the above description, it will be appreciated there may be proposed the addition of a switch or field having two possible values (e.g. a binary field) so as to transform a query. The value of the switch or field may be used to identify if copied/duplicated data needs to be included or not within the retrieved data set. This switch or field may operate at the two dimensions: mobile asset (rm); and fixed asset (rf). The logic may be represented as in Table 1 as follows:

| Usage of rm (where clause) | Usage of rf (where clause) | Required transformation (where clause) |
|---|---|---|
| Not used | Not used | + hcf=1 |
| Not used | Used | + hcf=1 |
| Used | Not Used | + hcf=1 or hcf=0 |
| Used | Used | + hcf=1 |

Accordingly, it will be appreciated that there may be no consideration for identifier or affinity group when selecting data for retrieval, because at this point the data has already been allocated according to the originating location and the determined home cluster of the originator. For instance, if the data originated within the home cluster affinity group or outside of that cluster, the switch will avoid duplication due to the copy of data created in the home cluster affinity group when the activity generated by the mobile component was not created in its home cluster. Put anther way, the switch may avoid duplication of all the data generated outside of the home cluster when reading such information.

Affinity Review Process

As mentioned above, because the dimensional affinity may change over the time, the clustering process may be recalculated periodically using recent datasets to ensure that the cluster variability (cv) is still under a target cluster variability (tcv). If it is not, the highest mobile key contributors to cluster variability may be identified and assigned to a new home cluster if required. For mobile networks, an example of this situation would be when subscribers have moved to live in another county or state.

An exemplary process for this may be summarized as follows:

(a) Execute clustering processes (e.g. as described above with reference to FIG. 4) to obtain a new list lt2[(f,m,c), . . . ];

(b) Determine if the cluster variability (cv) exceeds a target cluster variability value (tcv) (i.e. check if cv>tcv);

(c) If in (b) above, it is determined that the cluster variability (cv) does exceed the target cluster variability value (tcv). If so, then:

(ci) Execute mobile key home cluster calculation (e.g. as described above with reference to FIG. 4) using the new lt2 to obtain a new list of mobile home clusters lmhc2[(m,c), . . . ]; and (cii) Get the list of mobile keys (lm) that has a new mhc (mobile_key home cluster). For each of them: (1) Delete lp[(m), . . . ] records in old home cluster with hcf=0; (2) Copy lp[(m), . . . ] records from old home cluster with hcf=1 to new cluster with hcf=1; (3) Update lp[(m), . . . ] records in old home cluster with hcf=1 to hcf=0;

(d) If in (b) above, it is determined that the cluster variability (cv) does not exceed the target cluster variability value (tcv), do nothing.

From the description provided above, it will be understood that proposed embodiments may identify increase performance, reduce data duplication and improve resiliency of data in a distributed data storage system. By limiting replication of data elements to those marked as foreign to user's assigned home server (e.g. originating from a location outside of a home location), data storage and retrieval requirements may be reduced.

Embodiments may work with data inherent to activity of a user, not with user preference information. More specifically, by employing data related to activity generated in different locations, it may be simple to determine and collect data for allocating and/or distributing data in a distributed network. Also, by employing clustering techniques to create a cluster distribution, there may be no need to rely on potentially weak relationships between preferences that may easily change over time.

In some embodiments, there may be provided a system comprising a processing arrangement adapted to carry out any method previously described with reference to FIGS. 1 to 7.

Figure 8:
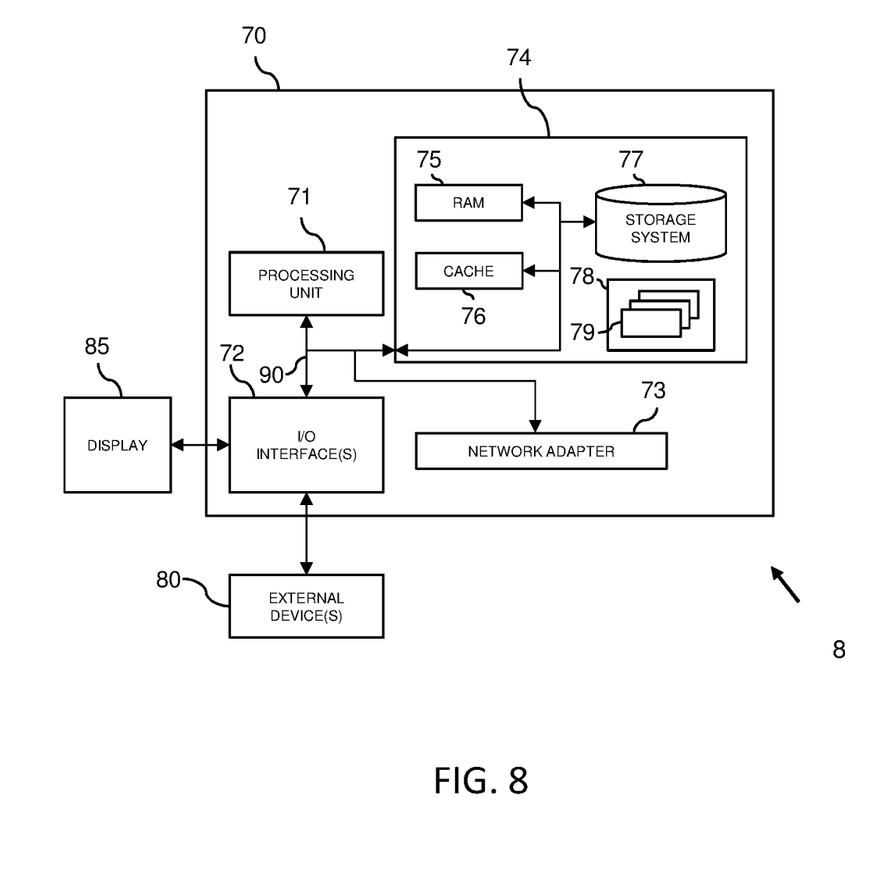
FIG. 8 is a simplified block diagram of a system according to a proposed embodiment.

By way of example, as illustrated in FIG. 8, embodiments may comprise a computer system 70, which may form part of a networked system 8. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for managing distribution of data elements in a distributed data storage system, the system comprising a plurality of distributed assets each having a data storage unit for locally storing one or more data elements of a distributed database, each distributed asset being associated with one of a plurality of affinity groups based on its location; and a mobile asset associated with a home location and associated with a first affinity group of the plurality of affinity groups based on the home location, wherein the method comprises:
    associating a data element provided by the mobile asset with a second affinity group of the plurality of affinity groups based on a current location of the mobile asset;
    associating each of the plurality of distributed assets with one of the plurality of affinity groups based on its geographic location by categorizing each of the plurality of assets according to a clustering algorithm, wherein the clustering algorithm is based on a pair for each mobile asset, each pair including the current location and home location of for a mobile asset, a target cluster variability value and a number of affinity groups in the plurality of affinity groups;
    allocating the data element to an asset associated with the second affinity group; and
    based on a determination that the current location of the mobile asset differs from the home location associated with the mobile asset, allocating a replica of the data element to an asset associated with the first affinity group,
    wherein a process of associating each of the plurality of distributed assets with one of a plurality of affinity groups according to the clustering algorithm based on its geographic location is repeated based on a determination that a measure of cluster variability exceeds a target variability value, and
    wherein repeating process of associating each of the plurality of distributed assets with one of a plurality of affinity groups includes incrementally increasing a number of affinity groups in the plurality of affinity groups and recalculating the measure of cluster variability until the measure of cluster variability is less than the target variability value.

2. The method of claim 1, further comprising:
associating the mobile asset with a home location based on historical data relating to previous usage or locations of the mobile asset.

3. The method of claim 1, further comprising:
receiving a request to retrieve a data element from the distributed database; and
    transforming the received request to a transformed request comprising an indicator adapted to indicate whether or not a replica of the data element was allocated to an asset.

4. The method of claim 3, further comprising:
retrieving the replica of the data element based on a value of the indicator of the transformed request.

* * * * *